United States Patent [19]

Lindner et al.

[11] 4,425,458

[45] Jan. 10, 1984

[54] POLYGUERBET ALCOHOL ESTERS

[75] Inventors: Robert A. Lindner, Weehawkan; Anthony O'Lenick, Fairlawn, both of N.J.

[73] Assignee: Henkel Corporation, Minneapolis, Minn.

[21] Appl. No.: 366,960

[22] Filed: Apr. 9, 1982

[51] Int. Cl.³ .............................................. C08K 5/11
[52] U.S. Cl. ................................................... 524/314
[58] Field of Search ...................... 524/315, 311, 314

[56] References Cited

U.S. PATENT DOCUMENTS

| | | | |
|---|---|---|---|
| 3,186,961 | 6/1965 | Sears | 524/315 |
| 3,784,595 | 1/1974 | Schirmer et al. | 524/315 |
| 3,836,499 | 9/1974 | Schirmer et al. | 524/315 |
| 4,131,575 | 12/1978 | Adelmann et al. | 528/196 |

FOREIGN PATENT DOCUMENTS 688344  3/1953  United Kingdom ................ 524/311

*Primary Examiner*—Joseph L. Schofer
*Assistant Examiner*—N. Sarofim
*Attorney, Agent, or Firm*—Forrest L. Collins; Patrick J. Span

[57] ABSTRACT

This invention deals with the production and use of a diacid ester formed from the reaction of the diacid and a guerbet alcohol.

8 Claims, No Drawings

POLYGUERBET ALCOHOL ESTERS

BACKGROUND OF THE INVENTION

1. Field of the Invention

This invention deals with the preparation, compositions, and application of complex esters which are useful in polycarbonate processing.

2. Description of the Art Practices

It is known that esters of simple alcohols may be used for various purposes including polycarbonate processing. In U.S. Pat. No. 3,784,595 issued Jan. 8, 1974 to Schirmer et al polycarbonate molding compositions are shown which are based on the esters of a trihydric alcohol and a saturated aliphatic carboxylic acid. U.S. Pat. No. 4,065,436 issued to Adelmann on Dec. 1977 describes thermoplastic molding compositions containing a mold release agent which is an ester of a saturated aliphatic carboxylic acid having from 10 to 20 carbon atoms per molecule and an aromatic hydroxy compound containing from 1 to 6 hydroxyl groups.

It is also known from U.S. Pat. No. 4,097,435 issued June 27, 1978 to Rawlings et al that montanic acid ester waxes may be employed in polycarbonate molding compositions. U.S. Pat. No. 4,131,575 issued Dec. 26, 1978 to Adelmann describes in combination with aromatic polycarbonates, mold release agents which are the esters of saturated aliphatic carboxylic acids with alcohols containing from 4 to 6 hydroxyl groups. The disclosures of U.S. Pat. No. 4,131,575 are also found in the related British Pat. No. 1,490,467 published Nov. 2, 1977. U.S. Pat. No. 4,143,024 issued Mar. 6, 1979 to Adelmann et al describes aromatic polycarbonate based thermoplastic molding compositions utilizing as a mold release agent the ester of a saturated aliphatic carboxylic acid containing from 10 to 20 carbon atoms per molecule and an aromatic hydroxyl compound from having 1 to 6 hydroxyl groups.

General disclosures of polycarbonate technology are found in U.S. Pat. No. 4,081,495 issued Mar. 28, 1978 to Freitag et al. Similar general disclosures are also found in U.S. Pat. No. 4,007,150 issued to Adelmann et al on Feb. 8, 1977.

To the extent that each of the foregoing patents is relevant to the present invention they are herein specifically incorporated by reference. Throughout the specification and claims, percentages and ratios are by weight, pressures are gauge and temperatures are Celsius unless otherwise noted.

SUMMARY OF THE INVENTION

A polycarbonate resin composition containing an effective amount of a mold release agent which is a diester of a (a) guerbet alcohol and (b) a member selected from the source group consisting of a dicarboxylic acid containing from 4 to 10 carbon atoms and mixtures thereof and where the guerbet alcohol contains a total of from about 16 to 40 carbon atoms.

DETAILED DESCRIPTION OF THE INVENTION

The present invention describes the esters of a guerbet alcohol, and in particular esters of a guerbet alcohol and a difunctional acid. The particular diacids with which the present invention is concerned are short chained acids containing less than 10 carbon atoms. Specifically the present invention is concerned with adipic, terephthalic, sebacic and succinic acids and mixtures thereof which are reacted with approximately two moles of a guerbet alcohol to obtain the completely esterified acid. The term source group means that the acid may be furnished from the anhydride, the acid per se and so forth.

The guerbet alcohol portion of the present invention is particularly important in that polycarbonate resins have a high requirement for clarity as they are often used to form clear articles including safety glasses. Accordingly clarity is a particularly important aspect in obtaining a polycarbonate resin. Unfortunately the polycarbonate resins tend to not release when molded, therefore agents must be employed to assist in releasing the polycarbonate resin from the mold. A substantial difficulty which has been found in the art is to ensure that the polycarbonate resin is not adversely affected by the mold release agent.

It will be observed in the present invention that the mold release agents of this invention result in polycarbonate products in which the clarity is not adversely affected. The esters of the present invention are observed to migrate sufficiently from the polycarbonate resin to the surface of the mold to effect release. The esters do not substantially sweat out or collect on the surface of the molded articles. Sweating out cause hazing which is a disadvantage for most mold release agents. Another important aspect in working with mold releae agents is the volatility of the compounds. It will of course be observed that the molding process requires large amounts of heat to liquify the polycarbonate. This in turn requires low volitility of the mold release agent so that the mold release agent is not lost to the atmosphere before it can function. It is also noted that an air pollution problem within a plant may arise where a mold release agent of high volatility is utilized. The products of the present invention will be observed to have low volatility thus presenting a distinct advantage over lower molecular weight materials.

The guerbet alcohols with which the present invention is concerned contain from about 16 to 40 carbon atoms total in the guerbet alcohol molecule. Preferably the total number of carbon atoms in the guerbet alcohol molecule will be from about 24 to 38 carbon atoms and in particular the 32 and 36 carbon atom guerbet alcohols are particularly useful.

It is known in the art that guerbet alcohols may be formed from the same or different alcohols i. e. a homo or hetro system. That is, a guerbet alcohol is the condensation product of two alcohol molecules joined at the beta carbon of the alcohol which has retained the hydroxyl functionality. The resultant product is therefore a highly branched primary alcohol containing a single hydroxyl group. It is possible to obtain mixtures of alcohols and to condense them into hetro systems. It is also possible to obtain products which are guerbet alcohols from a short chained alcohol. It is desired for reasons of polarity and compatibility with the polycarbonate system that homo guerbet alcohols be used. For the purpose of nomenclature a homo guerbet alcohol is considered to be one in which the aliphatic branches are identical in length or within six to eight carbon atoms difference between the branches. That is, the carbon chain branching from the point of attachment on the guerbet alcohol is preferably of equal length to the starting alcohol. Accordingly the even numbered guerbet alcohols are highly preferred. It is espcially preferred that the homo guerbet alcohols are formed from a starting alcohol having 16 or 18 carbon atoms. The preparation of the guerbet alcohols is well known in the art and therefore it is not particularly discussed at this point.

The preparation of the diester may be accomplished by using as the acid component the acid or an acid anhydride.

The diesters are formed when using the acid anhydride by reacting essentially one mole of the acid anhydride with two moles of the alcohol. This may be done such that the alcohol is present in an excess preferably not greater than two and one half moles of alcohol per mole acid anhydride. The anhydride reaction is two step while the acid reaction is one step. The latter reaction requires higher temperatures throughout the reaction to obtain completion. Due to the economics of the operation an excess of the alcohol may be used and is easily recovered due to the substantial difference in molecular weight between the reaction product and the starting alcohol.

The acid anhydride ester formation with the alcohol may be catalyzed with a metal, conveniently with a tin or titanium catalyst. The reaction thus proceeds when a small amount of heat is used to promote the reaction. Conveniently the reaction is conducted at from about 120° C. to about 250° C. over a period of about 1 to 8 hours. The water which is split out of the reaction is then distilled off together with any excess starting alcohol and the product is recovered in a high degree of purity. When desired a nitrogen sparge and vacuum may be applied in order to collect the water and any additional starting alcohol. The condition for obtaining the product from the acid rather than the acid anhydride are substantially similar.

The polycarbonates with which the present diesters are effective mold release agents include homopolycarbonates and copolycarbonates which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and alpha,alpha-bis-(hydroxyphenyl)-diisopropyl-benzenes, as well as their nuclear alkylated and nuclear-halogenated compounds. These and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846, in German Offenlegungsschriften (German Published Specifications) Nos. 1,570,703, 2,063,050, 2,063,052, 2,211,956 and 2,211,957, in French Patent Specification No. 1,561,518 and in the monograph "H. Schnell, Chemistry and Physics of Polycarbonates, Interscience Publishers, New York, 1964".

Preferred bisphenols are those of the formula I shown below:

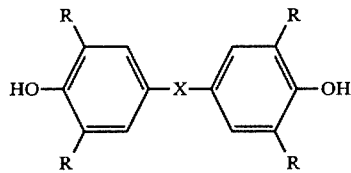

Formula I in which R is identical or different and denotes H, $C_1$–$C_4$-alkyl, Cl or Br, and in which X is a bond, $C_1C_8$-alkylene, $C_2$–$C_8$-alkylidene, $C_5$–$C_{15}$-cycloalkylene, $C_5$–$C_{15}$-cycloalkylidene, —SO— or formula II shown below:

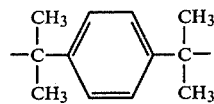

Examples of these bisphenols are 4,4'-dihydroxydiphenyl, 2,2-bis-(4-hydroxyphenyl)-propane, 2,4-bis(4-hydroxyphenyl)-2-methylbutane, 1,1-bis-(4-hydroxyphenyl)-cyclohexane, a,a-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, a,a-bis-(3,5-dimethyl-4-hydroxyphenyl)-p-diisopropyl-benzene, 2,2-bis-(3,5-dichloro-4-hydroxyphenyl)-propane and 2,2-bis(3,5-dibromo-4-hydroxyphenyl)-propane.

Examples of particulary preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(4-hydroxyphenyl)-propane and one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic polycarbonates can be prepared in accordance with known processes, such as, for example, in accordance with the melt trans-esterification process from bisphenols and diphenyl carbonate and the two-phase boundary process from bisphenols and phosgene, as described in the abovementioned literature.

The aromatic high-molecular weight polycarbonates can be branched due to the incorporation of small amounts, preferably of between 0.05 and 2.0 mol % (relative to diphenols employed), of trifunctional or more than trifunctional compounds, especially compounds with three of more phenolic hydroxyl groups.

Polycarbonates of this type are described, for example, in German Offenlegungsschriften (German Published Specifications) Nos. 1,570,533; 1,595,762; 2,116,974 and 2,113,347; British Patent Specification No. 1,079,821; U.S. Pat. No. 3,544,514 and German Patent Application No. P 25 00 092.4.

Some examples of compounds with three or more than three phenolic hydroxyl groups which can be used are phloroglucinol, 4,6-dimethyl-2,4,6-tri-(4-hydroxyphenyl)-heptane-2, 4,6-dimethyl-2,4,6-tri-(4-hydroxyphenyl)-heptane, 1,4,5-tri-(4-hydroxyphenyl)-benzene, 1,1,1-tri-(4-hydroxphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methyphenol, 2-(4-hydroxyphenyl)-2-(2,4- dihydroxyphenyl)-propane, hexa(4-(4-hydroxyphenylisopropyl)phenyl)orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)methyl)-benzene. Some of the other trifunctional compounds are 2,4-dihydroxybenzoic acid, trimesic acid, cyanuric chloride and 3,3-bis-(4-hydroxyphyenyl)-2-oxo-2,3-dihydroindole.

The aromatic high-molecular polycarbonates should as a rule have mean weight-average molecular weights M of at least 10,000; especially of 10,000 to 200,000; preferably of 20,000 to 80,000; determined by measuring the relative viscosity in $CH_2Cl_2$ at 25 degrees C. and a concentration of 0.5% by weight.

The thermoplastic polycarbonate molding compositions find use in several areas. Such examples of use for the polycarbonates of the present invention utilizing the mold release agents include the electrical industry and the optical field such as the stripping of sockets, coiled bodies, complicated housings, projector housings, switch cabinet bottoms and other similar applications.

The mold release agent of the present invention (the diester) is utilized with the polycarbonate in the manner of similar prior polycarbonate formulations. The level of use of the diester to the polycarbonate is from about 0.25% to about 1.0%; preferably from about 0.1% to about 0.25% by weight of the total polycarbonate composition.

The following are suggested embodiments of the present invention.

EXAMPLE I

The succinic acid diester of a guerbet alcohol containing between 24 and 28 total carbon atoms is prepared. The molten guerbet alcohol is added to the reaction pot followed by addition of succinic anhydride. The product is slowly heated to about 80° C. with that temperature being maintained until after the exotherm has subsided. Thereafter the mixture is heated to 170° C. and held at that temperature until the acid value is approximately 1.5 maximum. At this point the reaction is complete and the hydroxyl value is at a maximum of about ten.

The water is collected as a distillate using a vacuum. As the reaction mass was set to be a stoichiometric product little or no excess alcohol is found in the distillate.

In similar fashion the diguerbet ester of an essentially pure stearyl guerbet alcohol is obtained. Morover the adipic acid ester and the remaining esters of the foregoing guerbet alcohols are obtained utilizing techniques similar to those in the above example.

EXAMPLE II

A suggested utilization of the diester of succinic acid as obtained in Example I is conducted by using 0.12% by weight of the diester, and following the general procedure given at Column 6 of U.S. Pat. No. 4,065,436.

By so following the general teachings of the aforementioned reference it will observed that the various diesters of the guerbet alcohols of the present invention give polycarbonates of high clarity and low volatility. Similar results are obtained by using the remaining esters of Example I.

What is claimed is:

1. A polycarbonate resin composition containing an effective amount of a mold release agent which is a diester of a (a) guerbet alcohol and (b) a member selected from the source group consisting of a dicarboxylic acid containing from 4 to 10 carbon atoms and mixtures thereof and where the guerbet alcohol contains a total of from about 16 to about 40 carbon atoms.

2. The composition of claim 1 wherein the guerbet alcohol is a homoalcohol.

3. The composition of claim 1 wherein the guerbet alochol contains a total of from about 24 to 38 carbon atoms.

4. The composition of claim 1 wherein the diester is the succinic acid ester.

5. The composition of claim 1 wherein the diester is the adipic acid ester.

6. The composition of claim 1 wherein the diester is the terephthalate ester.

7. The composition of claim 1 wherein the diester is the sebacic acid ester.

8. The composition of claim 1 containing from about 0.025% to about 1.0% by weight of the diester.

* * * * *